US008572612B2

(12) United States Patent
Kern

(10) Patent No.: US 8,572,612 B2
(45) Date of Patent: Oct. 29, 2013

(54) AUTONOMIC SCALING OF VIRTUAL MACHINES IN A CLOUD COMPUTING ENVIRONMENT

(75) Inventor: Eric R. Kern, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 483 days.

(21) Appl. No.: 12/760,141

(22) Filed: Apr. 14, 2010

(65) Prior Publication Data

US 2011/0258621 A1 Oct. 20, 2011

(51) Int. Cl.
G06F 9/455 (2006.01)

(52) U.S. Cl.
USPC .................. 718/1; 717/177; 717/178

(58) Field of Classification Search
None
See application file for complete search history.

(56) References Cited

U.S. PATENT DOCUMENTS

| 7,093,086 | B1 | 8/2006 | Rietschote et al. |
|---|---|---|---|
| 7,370,164 | B1 | 5/2008 | Nagarkar et al. |
| 7,502,962 | B2* | 3/2009 | Yach et al. ............ 714/21 |
| 7,802,248 | B2 | 9/2010 | Broquere et al. |
| 7,831,600 | B2 | 11/2010 | Kilian |
| 7,890,613 | B2 | 2/2011 | Tameshige et al. |
| 7,917,617 | B1 | 3/2011 | Ponnapur et al. |
| 8,046,473 | B2 | 10/2011 | Piper et al. |
| 8,060,476 | B1 | 11/2011 | Afonso et al. |
| 2005/0198303 | A1 | 9/2005 | Knauerhase et al. |
| 2006/0085792 | A1 | 4/2006 | Traut |
| 2006/0184936 | A1 | 8/2006 | Abels et al. |
| 2007/0130566 | A1 | 6/2007 | van Rietschote et al. |
| 2007/0208918 | A1 | 9/2007 | Harbin et al. |
| 2007/0244938 | A1 | 10/2007 | Michael et al. |
| 2009/0070771 | A1 | 3/2009 | Yuyitung et al. |
| 2009/0113109 | A1 | 4/2009 | Nelson et al. |
| 2009/0138541 | A1 | 5/2009 | Wing et al. |
| 2009/0249284 | A1 | 10/2009 | Antosz et al. |
| 2009/0288084 | A1 | 11/2009 | Astete et al. |
| 2009/0293056 | A1 | 11/2009 | Ferris |
| 2009/0300076 | A1 | 12/2009 | Friedman et al. |
| 2009/0300151 | A1 | 12/2009 | Friedman et al. |
| 2010/0037038 | A1* | 2/2010 | Bieswanger et al. ......... 712/220 |
| 2010/0042720 | A1* | 2/2010 | Stienhans et al. ............. 709/226 |

(Continued)

OTHER PUBLICATIONS

"System and apparatus for automatic health monitoring and maintenance of virtual machines", IP.com No. IPCOM000191156D, Dec. 18, 2009.

(Continued)

Primary Examiner — Camquy Truong
(74) Attorney, Agent, or Firm — Edward J. Lenart; Cynthia G. Seal; Biggers & Ohanian, LLP.

(57) ABSTRACT

Autonomic scaling of virtual machines in a cloud computing environment, the cloud computing environment including virtual machines ('VMs'), the VMs installed upon cloud computers disposed within a data center, also including a cloud operating system and a data center administration server operably coupled to the VMs, including deploying, by the cloud operating system, an instance of a VM, flagging the instance of a VM for autonomic scaling; monitoring, by the cloud operating system, one or more operating characteristics of the instance of the VM; deploying, by the cloud operating system, an additional instance of the VM if a value of an operating characteristic exceeds a first predetermined threshold value, including executing a portion of the data processing workload on the additional instance of the VM; and terminating operation of the additional instance of the VM if a value of an operating characteristic declines below a second predetermined threshold value.

15 Claims, 5 Drawing Sheets

(56) References Cited

U.S. PATENT DOCUMENTS

| | | |
|---|---|---|
| 2010/0106885 A1 | 4/2010 | Gao et al. |
| 2010/0107158 A1 | 4/2010 | Chen et al. |
| 2010/0115332 A1 | 5/2010 | Zheng et al. |
| 2010/0131324 A1 | 5/2010 | Ferris |
| 2010/0205304 A1 | 8/2010 | Chaturvedi et al. |
| 2010/0211829 A1 | 8/2010 | Ziskind et al. |
| 2010/0241896 A1 | 9/2010 | Brown et al. |
| 2010/0293409 A1 | 11/2010 | Machida |
| 2010/0306379 A1* | 12/2010 | Ferris ............ 709/226 |
| 2010/0306382 A1 | 12/2010 | Cardosa et al. |
| 2011/0010515 A1 | 1/2011 | Ranade |
| 2011/0022695 A1 | 1/2011 | Dalal et al. |
| 2011/0022812 A1 | 1/2011 | Van der Linden et al. |
| 2011/0060832 A1 | 3/2011 | Govil et al. |
| 2011/0072208 A1 | 3/2011 | Gulati et al. |
| 2011/0126275 A1 | 5/2011 | Anderson et al. |
| 2011/0179176 A1 | 7/2011 | Ravichandran et al. |
| 2011/0208908 A1 | 8/2011 | Chou et al. |
| 2011/0231696 A1 | 9/2011 | Ji et al. |
| 2011/0231698 A1 | 9/2011 | Zlati et al. |
| 2011/0238803 A1 | 9/2011 | Kern |
| 2011/0246627 A1 | 10/2011 | Kern |

OTHER PUBLICATIONS

Kangarlou et al., "VNsnap: taking snapshots of virtual networked environments with minimal downtime", IEEE/IFIP International Conference on Dependable Systems & Networks, 2009.
Office Action, U.S. Appl. 12/730,402, Dec. 1, 2011.
Notice of Allowance, U.S. Appl. No. 12/730,402, Apr. 16, 2012.
Office Action, U.S. Appl. No. 12/752,762, May 31, 2012.
Office Action, U.S. Appl. No. 12/752,322, May 16, 2012.
Lagar-Cavilla et al., "SnowFlock: rapid virtual machine cloning for cloud computing", 2009, in Proceedings of the 4$^{th}$ ACM European conference on Computer systems (EUroSys '09). ACM, New York, NY, USA, 1-12.
Office Action, U.S. Appl. No. 12/759,976, Aug. 28, 2012.
Office Action, U.S. Appl. No. 12/760,141, Jul. 10, 2012.
Final Office Action, U.S. Appl. No. 12/785,322, Aug. 29, 2012.
Final Office Action, U.S. Appl. No. 12/752,762, Oct. 29, 2012.
Office Action, U.S. Appl. No. 12/760,141, Dec. 10, 2012.
Office Action, U.S. Appl. No. 12/759,976, Mar. 20, 2013.

* cited by examiner

AUTONOMIC SCALING OF VIRTUAL MACHINES IN A CLOUD COMPUTING ENVIRONMENT

BACKGROUND OF THE INVENTION

1. Field of the Invention

The field of the invention is data processing, or, more specifically, methods, apparatus, and products for autonomic scaling of virtual machines in a cloud computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of technology that has seen recent advancement is cloud computing. Cloud computing is increasingly recognized as a cost effective means of delivering information technology services through a virtual platform rather than hosting and operating the resources locally. Modern clouds with hundred or thousands of blade servers enable system administrators to build highly customized virtual machines to meet a huge variety of end user requirements. Many virtual machines, however, can reside on a single powerful blade server. Cloud computing has enabled customers to build virtualized servers on hardware over which they have absolutely no control. Deploying an application in a cloud computing environment simplifies the overall solution because the hardware becomes abstracted behind the cloud infrastructure. The end user, however, loses all control over the underlying hardware infrastructure including particularly a loss of control over scaling the number of virtual machines running an application. In a cloud environment scaling of an application is currently carried out manually by a system administrator—only when end users report performance degradation. This technique is slow and complex, and it inherently risks a user's experiencing a poor quality of service.

SUMMARY OF THE INVENTION

Methods, apparatus, and computer program products for autonomic scaling of virtual machines in a cloud computing environment, the cloud computing environment including a plurality of virtual machines ('VMs'), the VMs composed of modules of automated computing machinery installed upon cloud computers disposed within a data center, the cloud computing environment also including a cloud operating system and a data center administration server operably coupled to the VMs, including deploying, by the cloud operating system, an instance of a VM, including flagging the instance of a VM for autonomic scaling and executing a data processing workload on the instance of a VM; monitoring, by the cloud operating system, one or more operating characteristics of the instance of the VM; deploying, by the cloud operating system, an additional instance of the VM if a value of an operating characteristic exceeds a first predetermined threshold value, including executing a portion of the data processing workload on the additional instance of the VM; and terminating operation of the additional instance of the VM if a value of an operating characteristic declines below a second predetermined threshold value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

'Scaling,' as the term is used here, refers to a desirable feature of a cloud computing environment in which the environment gracefully handles varying workloads, either increasing or decreasing. The notion of grace here refers to the ability of the environment to adapt to varying workloads transparently, smoothly, and with a minimum of difficulty for users of the data processing service provided by such a cloud computing environment. 'Autonomic' refers to an ability for a cloud computing environment to manage its own operations with little or no governance by hand from any user or system administer. 'Autonomic scaling' therefore refers to an ability of a cloud computing environment to manage its own scaling operations with little or no governance by hand from any user or system administer. This paper describes autonomic scaling in the sense of adding and removing instances of virtual machines and their data processing applications as data processing workload increases and decreases within a cloud computing environment.

Figure 1:
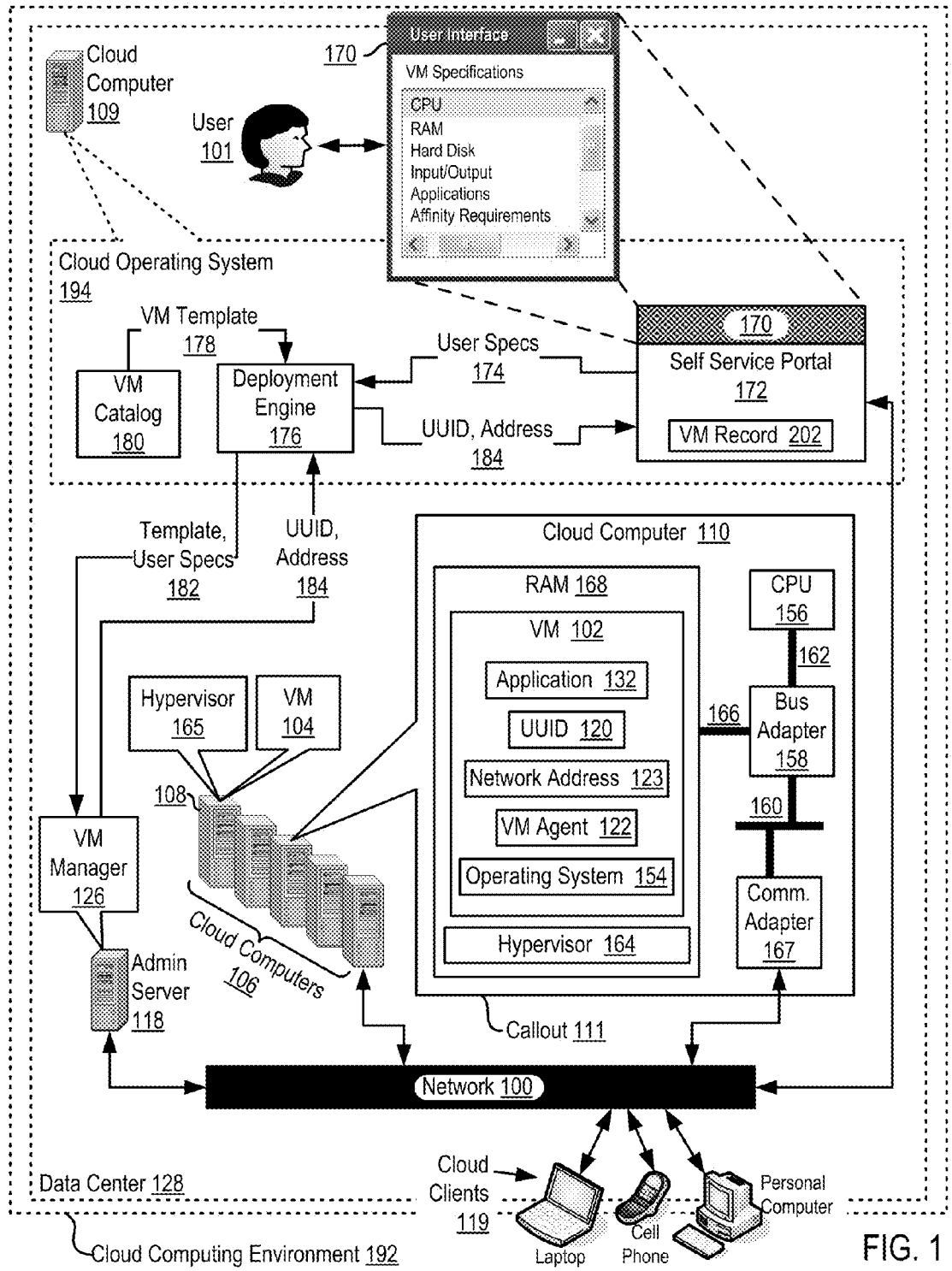
FIG. 1 sets forth functional block diagrams of example apparatus that carries out autonomic scaling of virtual machines in a cloud computing environment according to embodiments of the present invention.

Example methods, apparatus, and products for autonomic scaling of virtual machines in a cloud computing environment according to embodiments of the present invention are described with reference to the accompanying drawings, beginning with FIG. 1. FIG. 1 sets forth a functional block diagram of apparatus that carries out autonomic scaling of virtual machines in a cloud computing environment according to embodiments of the present invention. The apparatus in the example of FIG. 1 implements a cloud computing environment (192) that includes virtual machine ('VMs') (102, 104), where each VM is a module of automated computing machinery installed upon a cloud computer (109, 106) disposed within a data center (128).

The cloud computing environment (192) is a network-based, distributed data processing system that provides one or more cloud computing services. Although shown here, for convenience of explanation, with only a few cloud computers (106, 109) in the cloud computing environment, such a cloud computing environment typically includes, as a practical matter, many computers, hundreds or thousands of them, disposed within one or more data centers, with the cloud computers typically implemented in the blade form factor. Typical examples of cloud computing services include Software as a Service ('SaaS') and Platform as a Service ('PaaS'). SaaS is a model of software deployment in which a provider licenses an application for use as a service on demand. SaaS software vendors may host the application on their own clouds or download such applications from clouds to cloud clients, disabling the applications after use or after an on-demand contract expires.

PaaS is the delivery from a cloud computing environment of a computing platform and solution stack as a service. PaaS includes the provision of a software development platform designed for cloud computing at the top of a cloud stack. PaaS also includes workflow facilities for application design, application development, testing, deployment and hosting as well as application services such as team collaboration, web service integration and marshalling, database integration, security, scalability, storage, persistence, state management, application versioning, application instrumentation and developer community facilitation. These services are provisioned as an integrated solution over a network, typically the World Wide Web ('web') from a cloud computing environment. Taken together, SaaS and PaaS are sometimes referred to as 'cloudware.'

In addition to SaaS and PaaS, cloud computing services can include many other network-based services, such as, for example, utility computing, managed services, and web services. Utility computing is the practice of charging for cloud services like utilities, by units of time, work, or resources provided. A cloud utility provider can, for example, charge cloud clients for providing for a period of time certain quantities of memory, I/O support in units of bytes transferred, or CPU functions in units of CPU clock cycles utilized.

Managed services implement the transfer of all management responsibility as a strategic method for improving data processing operations of a cloud client, person or organization. The person or organization that owns or has direct oversight of the organization or system being managed is referred to as the offerer, client, or customer. The person or organization that accepts and provides the managed service from a cloud computing environment is regarded as a managed service provider or 'MSP.' Web services are software systems designed to support interoperable machine-to-machine interaction over a network of a cloud computing environment.

Web services provide interfaces described in a machine-processable format, typically the Web Services Description Language ('WSDL'). Cloud clients interact with web services of a cloud computing environment as prescribed by WSDL descriptions using Simple Object Access Protocol ('SOAP') messages, typically conveyed using the HyperText Transport Protocol ('HTTP') with an eXtensible Markup Language ('XML') serialization.

A data center (128) is a facility that is used for housing a quantity of electronic equipment, particularly computers and communications equipment. Data centers are maintained by organizations for the purpose of handling the data necessary for its operations. A bank, for example, may have data centers where all its customers' account information is maintained and transactions involving the accounts are carried out. Practically every company that is mid-sized or larger has at least one data center with the larger companies often having dozens of data centers. A cloud computing environment implemented with cloud computers in data centers will typically include many computers, although for ease of explanation, the cloud computing environment (192) in the example of FIG. 1 is shown with only a few (106, 109). The apparatus in the example of FIG. 1 includes a data center administration server (118), a cloud computer (109) running a cloud operating system (194), several additional cloud computers (106), and a data communications network (100) that couples the computers of the cloud computing environment (192) for data communications.

A 'computer' or 'cloud computer,' as the terms are used in this specification, refers generally to a multi-user computer that provides a service (e.g. database access, file transfer, remote access) or resources (e.g. file space) over a network connection. The terms 'computer' or 'cloud computer' as context requires, refer inclusively to the each computer's hardware as well as any application software, operating system software, or virtual machine installed or operating on the computer. A computer application in this context, that is, in a data center or a cloud computing environment, is often an application program that accepts connections through a computer network in order to service requests from users by sending back responses. The form factor of data center computers is often a blade; such computers are often referred to as 'blade servers.' Examples of application programs, often referred to simply as 'applications,' include file servers, database servers, backup servers, print servers, mail servers, web servers, FTP servers, application servers, VPN servers, DHCP servers, DNS servers, WINS servers, logon servers, security servers, domain controllers, backup domain controllers, proxy servers, firewalls, and so on.

The data center administration server (118) is a computer that is operably coupled to VMs in the cloud computing environment through data communications network (100). The data center administration server (118) provides the data center-level functions of communicating with hypervisors on cloud computers to install VMs, terminate VMs, and move VMs from one cloud computer to another within the data center. In addition, data center administration servers (in some embodiments support an additional module called a VM Manager (126) that implements direct communications with VMs through modules called VM agents (122) installed in the VMs themselves.

The example apparatus of FIG. 1 includes a cloud operating system (194) implemented as a module of automated computing machinery installed and operating on one of the cloud computers (109). The cloud operating system is in turn composed of several submodules: a virtual machine catalog (180), a deployment engine (176), and a self service portal (172). The self service portal is so-called because it enables users (101) themselves to set up VMs as they wish, although users specifying VMs through the self service portal typically have no knowledge whatsoever of the actual underlying computer hardware in the cloud computing environment—and no knowledge whatsoever regarding how their VMs are disposed upon the underlying hardware. Any particular VM can be installed on a cloud computer with many other VMs, all completely isolated from one another in operation. And all such VMs, from the perspective of any operating system or application running on a VM, can have completely different configurations of computer resources, CPUs, memory, I/O resources, and so on. Examples of cloud operating systems that can be adapted for use in autonomic scaling of virtual machines in a cloud computing environment according to embodiments of the present invention include VMware's Cloud OS™, the open-source eyeOS™ from eyeOS Forums, Xcerions' iCloud™, Microsoft's Windows Live Core™, Google's Chrome™, and gOS™ from Good OS.

In the example cloud operating system (194) of FIG. 1, the self service portal (172) exposes user interface (170) for access by any user (101) that is authorized to install VMs in the cloud computing environment (192). The user may be an enterprise Information Technology ('IT') professional, an IT manager or IT administrator, setting up VMs to run applications to be used by dozens, hundreds, or thousands of enterprise employees. Or the user (101) may be an individual subscriber to cloud computing services provided through or from the cloud computing environment. The self service portal (172) receives through the user interface (170) user specifications (174) of VMs. The user specifications include for each VM specifications of computer resources to be provided as the VM, types and numbers of computer processors, quantity of random access memory, hard disk storage, input/output resources, application programs, requirements or specifications for scaling, and so on. The specifications can also include requirements for I/O response timing, memory bus speeds, Service Level Agreements ('SLAs'), Quality Of Service ('QOS') requirements, and other VM specifications as may occur to those of skill in the art.

Having received user specifications for a VM, the cloud operating system (194) then deploys an instance of the now-specified VM in accordance with the received user specifications. The self service portal (172) passes the user specification (174) to the deployment engine (176). The VM catalog (180) contains VM templates, standard-form descriptions used by hypervisors to define and install VMs. The deployment engine (176) selects a VM template (178) that matches the user specifications. If the user specified an Intel processor, the deployment engine selects a VM template for a VM that executes applications on an Intel processor. If the user specified PCIe I/O functionality, the deployment engine selects a VM template for a VM that provides PCIe bus access. And so on. The deployment engine fills in the selected template with the user specifications and passes the complete template (182) to the data center administration server (118) in the local data center (127). The data center administration server (118) then calls a hypervisor (164) on a cloud computer (110) to install the instance of the VM (102) specified by the selected, completed VM template. The data center administration server (118) records a network address assigned to the new instance of the VM as well as a unique identifier for the new instance of the VM, here represented by a UUID, and returns the network address and the UUID (184) to the deployment engine (176). The deployment engine (176) returns the network address and the UUID (184) to the self service portal (172).

In this example, the cloud operating system deploys an instance of a VM (102) on a particular one (110) of the cloud computers (106). For further explanation, FIG. 1 sets forth in a callout (111) a block diagram of some of the components of automated computing machinery comprised within cloud computer (110). The cloud computer (110) of FIG. 1 includes at least one computer processor (156) or 'CPU' as well as random access memory ('RAM') (168) which is connected through a high speed memory bus (166) and bus adapter (158) to CPU (156) and to other components of the cloud computer (110). The example cloud computer (110) of FIG. 1 includes a communications adapter (167) for data communications with other computers through data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for autonomic scaling of virtual machines in a cloud computing environment according to embodiments of the present invention include modems for wired dial-up communications, Ethernet (IEEE 802.3) adapters for wired data communications network communications, and 802.11 adapters for wireless data communications network communications.

Stored in RAM (168) in the example cloud computer (110) of FIG. 1 is a hypervisor (164). The hypervisor (164) is a mechanism of platform-virtualization, a module of automated computing machinery that supports multiple operating systems running concurrently in separate virtual machines on the same host computer. The hypervisor (164) in this example is a native or bare-metal hypervisor that is installed directly upon the host computer's hardware to control the hardware and to monitor guest operating systems (154) that execute in virtual machines. Each guest operating system runs on a VM (102) that represents another system level above the hypervisor (164) on cloud computer (110). Examples of hypervisors useful or that can be improved for use in autonomic scaling of virtual machines in a cloud computing environment according to embodiments of the present invention include IBM's z/VM™, VMware's vCenter™, INTEGRITY™ from Green Hills Software, LynxSecure™ from LynuxWorks, IBM's POWER Hypervisor (PowerVM)™, Oracle's VM Server™, and Sun's Logical Domains Hypervisor™.

In the example of FIG. 1, the hypervisor (164) implements an instance of a VM (102) in the cloud computer (110). The instance of the VM (102) runs an application program (132) and an operating system (154). The VM (102) is a module of automated computing machinery, configured by the hypervisor, to allow the application (132) to share the underlying physical machine resources of cloud computer (110), the CPU (156), the RAM (168), the communications adapter (167) and so on. Each VM runs its own, separate operating system, and each operating system presents system resources to applications as though each application were running on a completely separate computer. That is, each VM is 'virtual' in the sense of being actually a complete computer in almost every respect. The only sense in which a VM is not a complete computer is that a VM typically makes available to an application or an operating system only a portion of the underlying hardware resources of a computer, particularly memory, CPU, and I/O resources. From the perspective of an application or an operating system running in a VM, a VM appears to be a complete computer.

Among other things, VMs enable multiple operating systems, even different kinds of operating systems, to co-exist on the same underlying computer hardware, in strong isolation from one another. The association of a particular application program with a particular VM eases the tasks of application provisioning, maintenance, high availability, and disaster recovery in data centers and in cloud computing environments. Because the operating systems are not required to be the same, it is possible to run Microsoft Windows™ in one VM and Linux™ in another VM on the same computer. Such an architecture can also run an older version of an operating system in one VM in order to support software that has not yet been ported to the latest version, while running the latest version of the same operating system in another VM on the same computer. Operating systems that are useful or that can be improved to be useful in autonomic scaling of virtual machines in a cloud computing environment according to embodiments of the present invention include UNIX™, Linux™, Microsoft XP™, AIX™, and IBM's i5/OS™.

In the example of FIG. 1, the VM (102) is characterized by a Universally Unique Identifier ('UUID') (120). VMs in the example of FIG. 1 implement a distributing computing environment, and a UUID is an identifier of a standard administered by the Open Software Foundation that enable a distributed computing environment to uniquely identify components in the environment without significant central coordination. A UUID can uniquely identify a component such as a VM with confidence that the identifier, that is, the value of a particular UUID, will never be unintentionally used to identify anything else. Information describing components labeled with UUIDs can, for example, later be combined into a single database without needing to resolve name conflicts, because each UUID value uniquely identifies the component with which it is associated. Examples of UUID implementations that can be adapted for use in autonomic scaling of virtual machines in a cloud computing environment according to embodiments of the present invention include Microsoft's Globally Unique Identifiers™ and Linux's ext2/ext3 file system.

The application (132), the operating system (154), and the VM agent (122) in the example of FIG. 1 are illustrated for ease of explanation as disposed in RAM (168), but many components of such modules typically are stored in non-volatile memory also, such as, for example, on a disk drive or in Electrically Erasable Read Only Memory ('EEPROM') or 'Flash' memory. In addition, being modules of automated computing machinery, a module such as an application (132), an operating system (154), or a VM agent (122) can be implemented in various combinations of computer hardware and software, or entirely as computer hardware, a network of sequential and non-sequential logic including implementations as, for example, a Complex Programmable Logic Device ('CPLD'), an Application Specific Integrated Circuit ('ASIC'), or a Field Programmable Gate Array ('FPGA').

The subject VM (102) in this example has scaling specifications provided as part of its user specifications (174). Such scaling specifications are specified by the user (101) through interface (170) and retained by the self service portal as part of the specification of a VM being installed in the cloud computer environment (192), thus 'flagging' the VM for autonomic scaling in the records maintained by the self service portal. The scaling specifications include, for example, a Boolean indication that scaling is enabled for a VM and threshold values for scaling operations. In an embodiment, for example, flagging an instance of a VM for autonomic scaling can include storing, in the cloud operating system in association with an identifier of the instance of a VM, predetermined threshold values of operating characteristics, including threshold values for processor utilization and for memory utilization. In this example, the scaling specifications are retained in a data record (202) for the specified, deployed instance of the VM (102).

In deploying the instance of the VM (102), the cloud computing environment executes a data processing workload on the instance of the VM. The workload is executed through data processing application program (132) installed as a component of the instance of the VM (102). The workload typically is a request/response service provided to cloud clients (119) by accepting connections through a computer network (100) in order to service requests from users by sending back responses. As mentioned, examples of application programs that execute the data processing workload include file servers, database servers, backup servers, print servers, mail servers, web servers, FTP servers, application servers, VPN servers, DHCP servers, DNS servers, WINS servers, logon servers, security servers, domain controllers, backup domain controllers, proxy servers, firewalls, and so on.

Having deployed an instance of a VM, flagged the instance for autonomic scaling, and executed a data processing workload upon the instance, the cloud operating system monitors one or more operating characteristics of the instance of the VM. The cloud operating system maintains communications with the instance of the VM through network (100) and/or through a VM Manager (126) on the data center administration server (118). Examples of monitored operating characteristics include computer processor or 'CPU' utilization, memory utilization, request/response latency, I/O resource utilization, and so on. Monitoring includes comparing actual monitored values of operating characteristics with predetermined threshold values and determining whether to add or remove additional instances of the VM in dependence upon the results of such comparisons. The cloud operating system deploys an additional instance of the VM if a value of an operating characteristic exceeds a first predetermined threshold value, including executing a portion of the data processing workload on the additional instance of the VM. Given a first predetermined threshold value of 75% of CPU utilization compared with a current monitored actual value of 85% of CPU utilization, for example, the cloud operating system deploys an additional instance (104) of the VM, and shifts a portion of the data processing workload to the additional instance (104). Including the additional instance (104) in a workload balancing cluster with the first instance (102), for example, automatically shares the workload among the two instances because the additional instance (104), being identical to the first instance (102), contains and executes the same data processing application (132).

The cloud operating system continues monitoring one or more operating characteristics of the first instance of the VM (102), terminating operation of the additional instance (104) of the VM if a value of an operating characteristic declines below a second predetermined threshold value. Continuing the example explanation with CPU utilization as a monitored operating characteristic and taking as a second predetermined threshold value the figure 25% CPU utilization, the cloud operating system terminates the additional instance (104) if actual CPU utilization by the first instance (102) the VM drops below 25%.

The arrangement of the servers (118), the cloud computers (106, 109), and the network (100) making up the example apparatus illustrated in FIG. 1 are for explanation, not for limitation. Data processing systems useful for autonomic scaling of virtual machines in a cloud computing environment according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
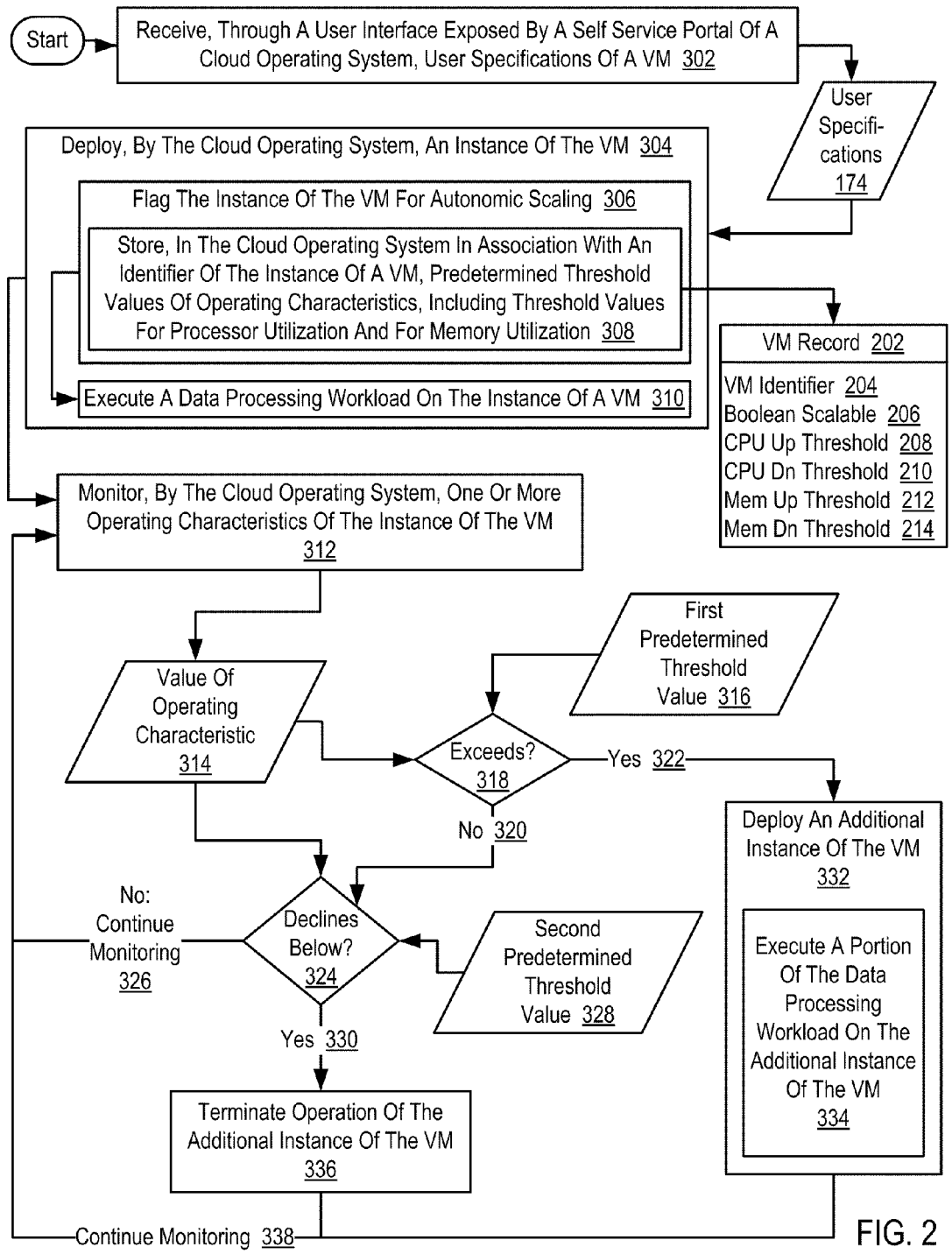
FIGS. 2-5 set forth flowcharts illustrating example methods of autonomic scaling of virtual machines in a cloud computing environment according to embodiments of the present invention.

For further explanation, FIG. 2 sets forth a flowchart illustrating an example method of autonomic scaling of virtual machines in a cloud computing environment according to embodiments of the present invention. The method of FIG. 2 is implemented in a cloud computing environment by and upon apparatus similar to that described above with reference to FIG. 1, and the method of FIG. 2 is therefore described here with reference both to FIGS. 1 and 2, using reference numbers from both drawings. The method of FIG. 2 is carried out in a cloud computing environment (192) that includes VMs, that is, instances of VMs (102, 104), with at least one data center administration server (118) operably coupled to the VMs, operably coupled as in the example of FIG. 1 through a data communications network (100). The cloud computing environment (192) includes a cloud operating system (194) implemented as a module of automated computing machinery installed and operating on one of the cloud computers (109). The cloud operating system is in turn composed of several submodules: a virtual machine catalog (180), a deployment engine (176), and a self service portal (172).

In this example, operable coupling of the data center administration server (118) to instances of VMs includes, not only the network (100), but also a VM manager (126) implemented as a module of automated computing machinery on data center administration server (118) and a VM agent (122) that is also implemented as a module of automated computing machinery on VM instance (102). The VM Manager (126) is shown here for convenience of explanation as one module of automated computing machinery installed upon data center administration server (118), although as a practical matter, a data center can include multiple VM Managers, and VM Managers can be installed upon any data center computer or blade server having data communications connections to the VMs in the data center, including installation in an instance of a VM in a data center blade server, for example. The VM manager (126) implements administrative functions that communicate with VM agents on VMs to configure the VMs in a data center. The VM manager (126) and the VM agent (122) are configured to carry out data communications through the network (100) between the data center administration server (118) and instances of VMs on cloud computers.

The method of FIG. 2 includes receiving (302), through a user interface (170) exposed by a self service portal (172) of a cloud operating system (194), user specifications (174) of a VM. Such user specifications typically include specifications of computer processors, random access memory, hard disk storage, input/output resources, application programs, as well as requirements or specifications for autonomic scaling.

The method of FIG. 2 also includes deploying (304), by the cloud operating system (194), an instance of the VM (102), including flagging (206) the instance of the VM for autonomic scaling and executing (310) a data processing workload on the instance of the VM. Deploying (304) the VM is carried out by deploying the VM in accordance with the received user specifications (174). In at least some embodiments, the deployment is carried out by a deployment engine (176) module of the cloud operating system (194). In this example, flagging (306) the instance of the VM for autonomic scaling includes storing (308, 202), in the cloud operating system in association with an identifier (204) of the instance of a VM, a Boolean indication (206) that the VM is autonomically scalable, and predetermined threshold values of operating characteristics, including threshold values for processor utilization (208, 210) and for memory utilization (212, 214).

The method of FIG. 2 also includes monitoring (312), by the cloud operating system (194), one or more operating characteristics of the instance of the VM (102). The cloud operating system maintains communications with the instance of the VM through network (100) and/or through a VM Manager (126) on the data center administration server (118). Examples of monitored operating characteristics include computer processor or 'CPU' utilization, memory utilization, request/response latency, I/O resource utilization, and so on.

The method of FIG. 2 also includes deploying (332), by the cloud operating system, an additional instance (104) of the VM if a value of an operating characteristic exceeds (322) a first predetermined threshold value, including executing (334) a portion of the data processing workload on the additional instance of the VM. The cloud operating system compares (318) actual monitored values (314) of operating characteristics with predetermined threshold values (316) and determines whether to add or remove additional instances of the VM in dependence upon the results of such comparisons. Given a first predetermined threshold value of 75% of CPU utilization compared with a current monitored actual value of 85% of CPU utilization, for example, the cloud operating system deploys an additional instance (104) of the VM, and shifts a portion of the data processing workload to the additional instance (104). Including the additional instance (104) in a workload balancing cluster with the first instance (102), for example, automatically shares the workload among the two instances because the additional instance (104), being identical to the first instance (102), contains and executes the same data processing application (132). After deploying (332) the additional instance (104), the method returns (338) to monitoring (312) the operating characteristics of the instance of the VM.

The method of FIG. 2 also includes terminating (336) operation of the additional instance (104) of the VM if a value of an operating characteristic declines below (330) a second predetermined threshold value (328). If a particular actual monitored value of an operating characteristic (314) does not exceed (320) a first predetermined threshold value (316), the method of FIG. 2 proceeds to test for a low value of the operating characteristic, determining (324) whether a value of an operating characteristic (314) declines below (330) a second predetermined threshold value (328). Continuing the example explanation with CPU utilization as a monitored operating characteristic and taking as a second predetermined threshold value the figure 25% CPU utilization, the cloud operating system terminates the additional instance (104) if actual CPU utilization by the first instance (102) the VM drops below 25%. After terminating (336) the additional instance (104), the method returns (338) to monitoring (312) the operating characteristics of the instance of the VM. If the particular value under test (314) does not decline below a second predetermined threshold value (328), then the method returns (326) to monitoring (312) the operating characteristics of the instance of the VM.

Figure 3:
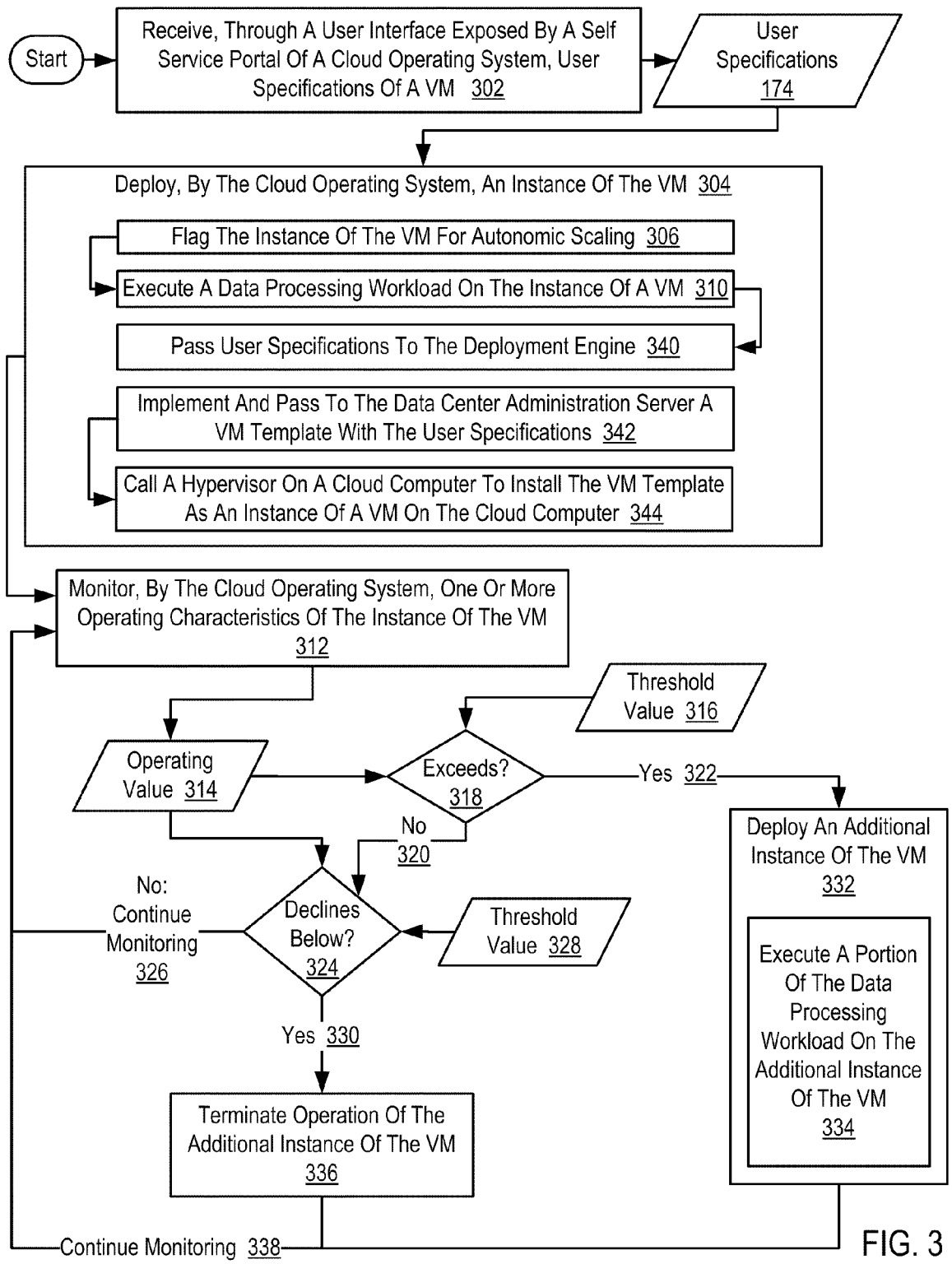

For further explanation, FIG. 3 sets forth a flowchart illustrating an example method of autonomic scaling of virtual machines in a cloud computing environment according to embodiments of the present invention. The method of FIG. 3 is implemented in a cloud computing environment by and upon apparatus similar to that described above with reference to FIG. 1, and the method of FIG. 3 is therefore described here with reference both to FIGS. 1 and 3, using reference numbers from both drawings. The method of FIG. 3 is carried out in a cloud computing environment (192) that includes VMs, that is, instances of VMs (102, 104), with at least one data center administration server (118) operably coupled to the VMs, operably coupled as in the example of FIG. 1 through a data communications network (100). The cloud computing environment (192) includes a cloud operating system (194) implemented as a module of automated computing machinery installed and operating on one of the cloud computers (109). The cloud operating system is in turn composed of several submodules: a virtual machine catalog (180), a deployment engine (176), and a self service portal (172).

In this example, operable coupling of the data center administration server (118) to instances of VMs includes, not only the network (100), but also a VM manager (126) implemented as a module of automated computing machinery on data center administration server (118) and a VM agent (122)

that is also implemented as a module of automated computing machinery on VM instance (102). The VM Manager (126) is shown here for convenience of explanation as one module of automated computing machinery installed upon data center administration server (118), although as a practical matter, a data center can include multiple VM Managers, and VM Managers can be installed upon any data center computer or blade server having data communications connections to the VMs in the data center, including installation in an instance of a VM in a data center blade server, for example. The VM manager (126) implements administrative functions that communicate with VM agents on VMs to configure the VMs in a data center. The VM manager (126) and the VM agent (122) are configured to carry out data communications through the network (100) between the data center administration server (118) and instances of VMs on cloud computers.

The method of FIG. 3 is similar to the method of FIG. 2, including as it does receiving (302) user specifications (174) of a VM, deploying (304) an instance of the VM (102), monitoring (312) operating characteristics of the instance of the VM, deploying (332) an additional instance of the VM if a value of an operating characteristic exceeds a first predetermined threshold value, and terminating (226) operation of the additional instance of the VM if a value of an operating characteristic declines below a second predetermined threshold value. In the method of FIG. 3, however, deploying (304) an instance of the VM (102) includes passing (340) by the self service portal (172) user specifications (174) for the instance of a VM to the deployment engine (176); implementing (342) and passing to the data center administration server (118), by the deployment engine (176), a VM template with the user specifications (182); and calling (344), by the data center administration server (118), a hypervisor (164) on a cloud computer (110) to install the VM template as an instance of a VM (102) on the cloud computer.

Figure 4:
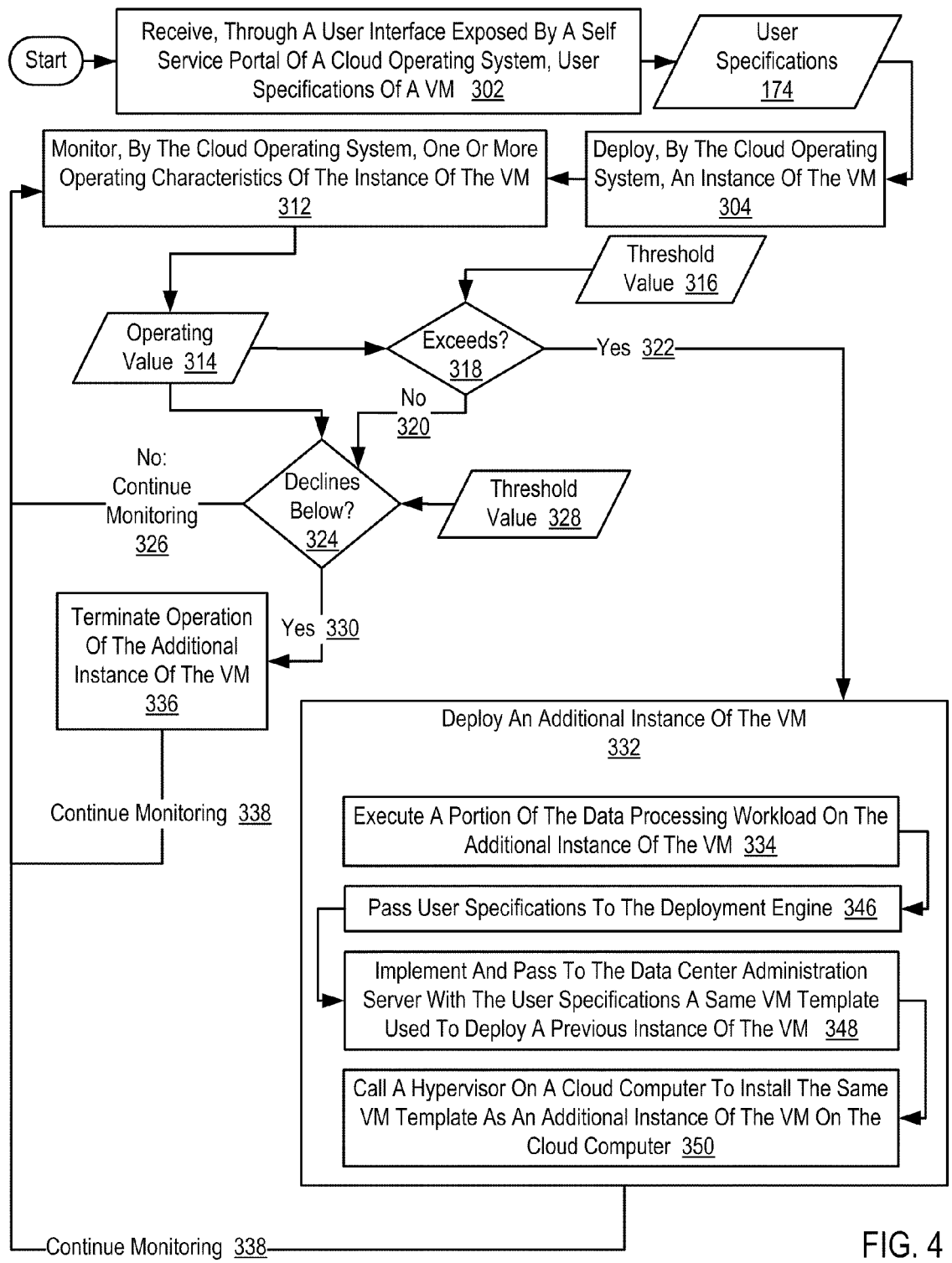
Figure 5:
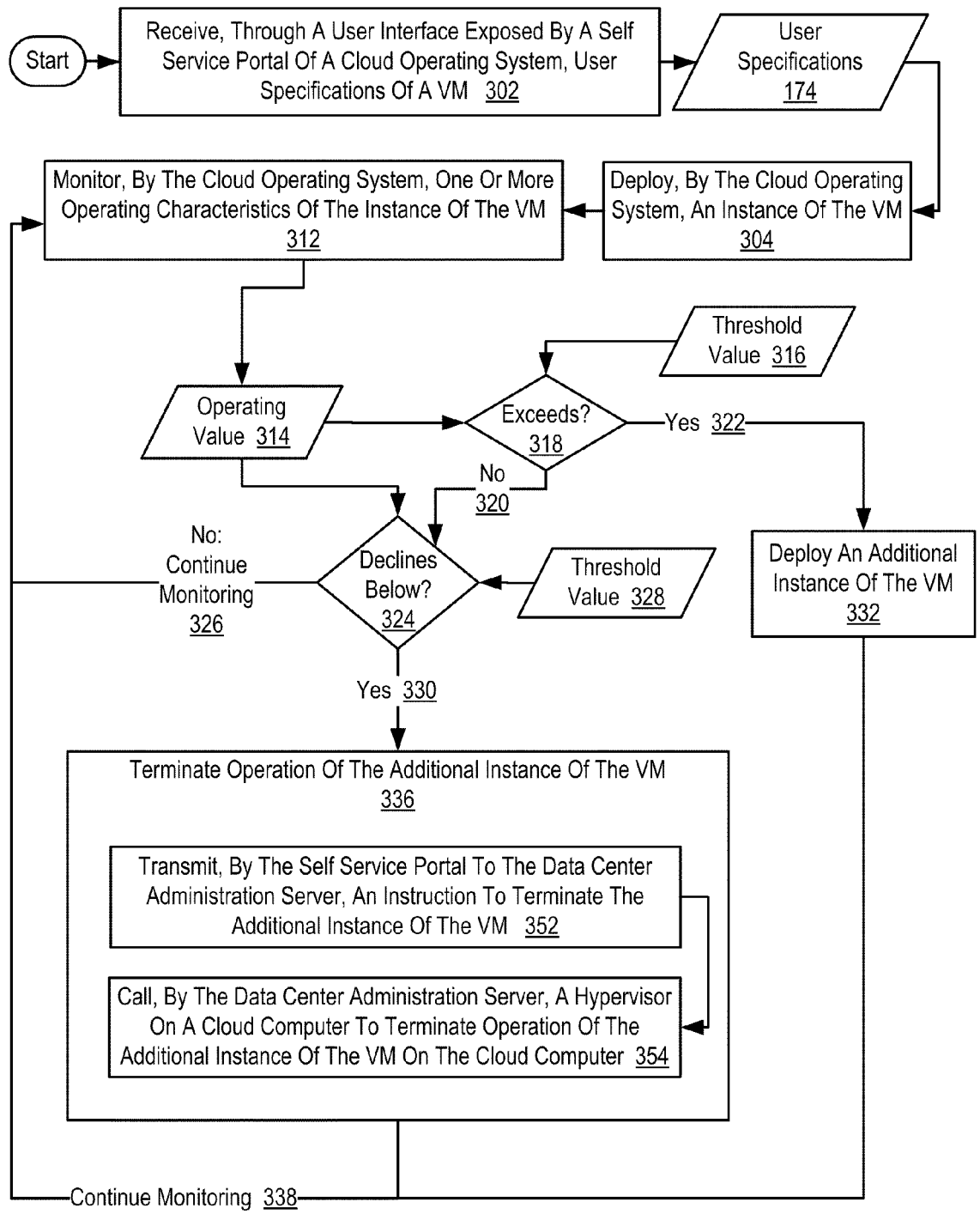

For further explanation, FIG. 4 sets forth a flowchart illustrating an example method of autonomic scaling of virtual machines in a cloud computing environment according to embodiments of the present invention. The method of FIG. 4 is implemented in a cloud computing environment by and upon apparatus similar to that described above with reference to FIG. 1, and the method of FIG. 4 is therefore described here with reference both to FIGS. 1 and 4, using reference numbers from both drawings. The method of FIG. 4 is carried out in a cloud computing environment (192) that includes VMs, that is, instances of VMs (102, 104), with at least one data center administration server (118) operably coupled to the VMs, operably coupled as in the example of FIG. 1 through a data communications network (100). The cloud computing environment (192) includes a cloud operating system (194) implemented as a module of automated computing machinery installed and operating on one of the cloud computers (109). The cloud operating system is in turn composed of several submodules: a virtual machine catalog (180), a deployment engine (176), and a self service portal (172).

In this example, operable coupling of the data center administration server (118) to instances of VMs includes, not only the network (100), but also a VM manager (126) implemented as a module of automated computing machinery on data center administration server (118) and a VM agent (122) that is also implemented as a module of automated computing machinery on VM instance (102). The VM Manager (126) is shown here for convenience of explanation as one module of automated computing machinery installed upon data center administration server (118), although as a practical matter, a data center can include multiple VM Managers, and VM Managers can be installed upon any data center computer or blade server having data communications connections to the VMs in the data center, including installation in an instance of a VM in a data center blade server, for example. The VM manager (126) implements administrative functions that communicate with VM agents on VMs to configure the VMs in a data center. The VM manager (126) and the VM agent (122) are configured to carry out data communications through the network (100) between the data center administration server (118) and instances of VMs on cloud computers.

The method of FIG. 4 is similar to the method of FIG. 2, including as it does receiving (302) user specifications (174) of a VM, deploying (304) an instance of the VM (102), monitoring (312) operating characteristics of the instance of the VM, deploying (332) an additional instance of the VM if a value of an operating characteristic exceeds a first predetermined threshold value, and terminating (226) operation of the additional instance of the VM if a value of an operating characteristic declines below a second predetermined threshold value. In the method of FIG. 4, however, deploying (332) an additional instance of the VM if a value of an operating characteristic exceeds a first predetermined threshold value includes passing (336) by the self service portal (172) user specifications for the additional instance of the VM (104) to the deployment engine (176); implementing (348) and passing to the data center administration server (118), by the deployment engine (176) with the user specifications, a same VM template (182) used to deploy a previous instance (102) of the VM; and calling (350), by the data center administration server (118), a hypervisor (163) on a cloud computer (108) to install the same VM template as a additional instance (104) of the VM on a cloud computer (108).

For further explanation, FIG. 4 sets forth a flowchart illustrating an example method of autonomic scaling of virtual machines in a cloud computing environment according to embodiments of the present invention. The method of FIG. 4 is implemented in a cloud computing environment by and upon apparatus similar to that described above with reference to FIG. 1, and the method of FIG. 4 is therefore described here with reference both to FIGS. 1 and 4, using reference numbers from both drawings. The method of FIG. 4 is carried out in a cloud computing environment (192) that includes VMs, that is, instances of VMs (102, 104), with at least one data center administration server (118) operably coupled to the VMs, operably coupled as in the example of FIG. 1 through a data communications network (100). The cloud computing environment (192) includes a cloud operating system (194) implemented as a module of automated computing machinery installed and operating on one of the cloud computers (109). The cloud operating system is in turn composed of several submodules: a virtual machine catalog (180), a deployment engine (176), and a self service portal (172).

In this example, operable coupling of the data center administration server (118) to instances of VMs includes, not only the network (100), but also a VM manager (126) implemented as a module of automated computing machinery on data center administration server (118) and a VM agent (122) that is also implemented as a module of automated computing machinery on VM instance (102). The VM Manager (126) is shown here for convenience of explanation as one module of automated computing machinery installed upon data center administration server (118), although as a practical matter, a data center can include multiple VM Managers, and VM Managers can be installed upon any data center computer or blade server having data communications connections to the VMs in the data center, including installation in an instance of a VM in a data center blade server, for example. The VM manager (126) implements administrative functions that communicate with VM agents on VMs to configure the VMs in a data center. The VM manager (126) and the VM agent (122) are configured to carry out data communications through the network (100) between the data center administration server (118) and instances of VMs on cloud computers.

The method of FIG. 4 is similar to the method of FIG. 2, including as it does receiving (302) user specifications (174) of a VM, deploying (304) an instance of the VM (102), monitoring (312) operating characteristics of the instance of the VM, deploying (332) an additional instance of the VM if a value of an operating characteristic exceeds a first predetermined threshold value, and terminating (226) operation of the additional instance of the VM if a value of an operating characteristic declines below a second predetermined threshold value. In the method of FIG. 4, however, terminating (226) operation of the additional instance of the VM if a value of an operating characteristic declines below a second predetermined threshold value includes transmitting (352), by the self service portal (172) to the data center administration server (118), an instruction to terminate the additional instance (104) of the VM; and calling (354), by the data center administration server (118), a hypervisor (165) on a cloud computer (108) to terminate operation of the additional instance (104) of the VM on the cloud computer (108).

Example embodiments of the present invention are described largely in the context of a fully functional computer system for autonomic scaling of virtual machines in a cloud computing environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, that is as apparatus, or as a method or a computer program product. Accordingly, aspects of the present invention may take the form of an entirely hardware embodiment, embodiments that are at least partly software (including firmware, resident software, micro-code, etc.), with embodiments combining software and hardware aspects that may generally be referred to herein as a "circuit," "module," "apparatus," or "system." Furthermore, aspects of the present invention may take the form of a computer program product embodied in one or more computer readable media having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of autonomic scaling of virtual machines in a cloud computing environment, the cloud computing environment comprising a plurality of virtual machines ('VMs'), the VMs comprising modules of automated computing machinery installed upon cloud computers disposed within a data center, the cloud computing environment further comprising a cloud operating system and a data center administration server operably coupled to the VMs, the method comprising:

deploying, by the cloud operating system, an instance of a VM, including flagging the instance of a VM for autonomic scaling including termination and executing a data processing workload on the instance of a VM;

monitoring, by the cloud operating system, one or more operating characteristics of the instance of the VM;

deploying, by the cloud operating system, an additional instance of the VM if a value of an operating characteristic exceeds a first predetermined threshold value, including executing a portion of the data processing workload on the additional instance of the VM; and terminating operation of the additional instance of the VM if a value of an operating characteristic declines below a second predetermined threshold value;

wherein the cloud operating system comprises a module of automated computing machinery, further comprising a self service portal and a deployment engine, and deploying an instance of a VM further comprises:

passing by the self service portal user specifications for the instance of a VM to the deployment engine;

implementing and passing to the data center administration server, by the deployment engine, a VM template with the user specifications; and calling, by the data center administration server, a hypervisor on a cloud computer to install the VM template as an instance of a VM on the cloud computer.

2. The method of claim 1 wherein:

the cloud operating system comprises a module of automated computing machinery, further comprising a self service portal and a deployment engine;

the method further comprises receiving, through a user interface exposed by the self service portal, user specifications of the VM, the user specifications including specifications of computer processors, random access memory, hard disk storage, input/output resources, application programs, and a specification for autonomic scaling that includes predetermined threshold values for operating characteristics; and deploying an instance of a VM further comprises deploying the instance of a VM in the cloud computing environment in accordance with the received user specifications.

3. The method of claim 1 wherein flagging the instance of a VM for autonomic scaling includes storing, in the cloud operating system in association with an identifier of the instance of a VM, predetermined threshold values of operating characteristics, including threshold values for processor utilization and for memory utilization.

4. The method of claim 1 wherein the cloud operating system comprises a module of automated computing machinery, further comprising a self service portal and a deployment engine, and deploying an additional instance of the VM further comprises:

passing by the self service portal user specifications for the additional instance of the VM to the deployment engine;

implementing and passing to the data center administration server, by the deployment engine with the user specifications, a same VM template used to deploy a previous instance of the VM; and calling, by the data center administration server, a hypervisor on a cloud computer to install the same VM template as a additional instance of the VM on a cloud computer.

5. The method of claim 1 wherein the cloud operating system comprises a module of automated computing machinery, further comprising a self service portal, and terminating operation of the additional instance of the VM further comprises:

transmitting, by the self service portal to the data center administration server, an instruction to terminate the additional instance of the VM; and calling, by the data center administration server, a hypervisor on a cloud computer to terminate operation of the additional instance of the VM on the cloud computer.

6. An apparatus for autonomic scaling of virtual machines in a cloud computing environment, the apparatus comprising:

a plurality of virtual machines ('VMs'), the VMs comprising modules of automated computing machinery installed upon cloud computers disposed within a data center;

a cloud operating system;

a data center administration server operably coupled to the VMs, at least one computer processor; and a computer memory operatively coupled to the computer processor, the computer memory having disposed within it computer program instructions which when executed cause the apparatus to function by:

deploying, by the cloud operating system, an instance of a VM, including flagging the instance of a VM for autonomic scaling including termination and executing a data processing workload on the instance of a VM;

monitoring, by the cloud operating system, one or more operating characteristics of the instance of the VM;

deploying, by the cloud operating system, an additional instance of the VM if a value of an operating characteristic exceeds a first predetermined threshold value, including executing a portion of the data processing workload on the additional instance of the VM; and terminating operation of the additional instance of the VM if a value of an operating characteristic declines below a second predetermined threshold value;

wherein the cloud operating system comprises a module of automated computing machinery, further comprising a self service portal and a deployment engine, and deploying an instance of a VM further comprises:

passing by the self service portal user specifications for the instance of a VM to the deployment engine;

implementing and passing to the data center administration server, by the deployment engine, a VM template with the user specifications; and calling, by the data center administration server, a hypervisor on a cloud computer to install the VM template as an instance of a VM on the cloud computer.

7. The apparatus of claim 6 wherein:

the cloud operating system comprises a module of automated computing machinery, further comprising a self service portal and a deployment engine;

the computer program instructions further cause the apparatus to function by receiving, through a user interface exposed by the self service portal, user specifications of the VM, the user specifications including specifications of computer processors, random access memory, hard disk storage, input/output resources, application programs, and a specification for autonomic scaling that includes predetermined threshold values for operating characteristics; and deploying an instance of a VM further comprises deploying the instance of a VM in the cloud computing environment in accordance with the received user specifications.

8. The apparatus of claim 6 wherein flagging the instance of a VM for autonomic scaling includes storing, in the cloud operating system in association with an identifier of the instance of a VM, predetermined threshold values of operating characteristics, including threshold values for processor utilization and for memory utilization.

9. The apparatus of claim 6 wherein the cloud operating system comprises a module of automated computing machinery, further comprising a self service portal and a deployment engine, and deploying an additional instance of the VM further comprises:

passing by the self service portal user specifications for the additional instance of the VM to the deployment engine;

implementing and passing to the data center administration server, by the deployment engine with the user specifications, a same VM template used to deploy a previous instance of the VM; and calling, by the data center administration server, a hypervisor on a cloud computer to install the same VM template as a additional instance of the VM on a cloud computer.

10. The apparatus of claim 6 wherein the cloud operating system comprises a module of automated computing machinery, further comprising a self service portal, and terminating operation of the additional instance of the VM further comprises:

transmitting, by the self service portal to the data center administration server, an instruction to terminate the additional instance of the VM; and calling, by the data center administration server, a hypervisor on a cloud computer to terminate operation of the additional instance of the VM on the cloud computer.

11. A computer program product for autonomic scaling of virtual machines in a cloud computing environment, the cloud computing environment comprising a plurality of virtual machines ('VMs'), the VMs comprising modules of automated computing machinery installed upon cloud computers disposed within a data center, a cloud operating system, a data center administration server operably coupled to the VMs, the computer program product disposed upon a computer readable storage medium, wherein the computer readable storage medium is not signal, the computer program product comprising computer program instructions which when executed cause the VMs and computers in the cloud computing environment to function by:

deploying, by the cloud operating system, an instance of a VM, including flagging the instance of a VM for autonomic scaling including termination and executing a data processing workload on the instance of a VM;

monitoring, by the cloud operating system, one or more operating characteristics of the instance of the VM;

deploying, by the cloud operating system, an additional instance of the VM if a value of an operating characteristic exceeds a first predetermined threshold value, including executing a portion of the data processing workload on the additional instance of the VM; and terminating operation of the additional instance of the VM if a value of an operating characteristic declines below a second predetermined threshold value;

wherein the cloud operating system comprises a module of automated computing machinery, further comprising a self service portal and a deployment engine, and deploying an instance of a VM further comprises:

passing by the self service portal user specifications for the instance of a VM to the deployment engine;

implementing and passing to the data center administration server, by the deployment engine, a VM template with the user specifications; and calling, by the data center administration server, a hypervisor on a cloud computer to install the VM template as an instance of a VM on the cloud computer.

12. The computer program product of claim 11 wherein:

the cloud operating system comprises a module of automated computing machinery, further comprising a self service portal and a deployment engine;

the computer program instructions further cause the VMs and computers to function by receiving, through a user interface exposed by the self service portal, user specifications of the VM, the user specifications including specifications of computer processors, random access memory, hard disk storage, input/output resources, application programs, and a specification for autonomic scaling that includes predetermined threshold values for operating characteristics; and deploying an instance of a VM further comprises deploying the instance of a VM in the cloud computing environment in accordance with the received user specifications.

13. The computer program product of claim 11 wherein flagging the instance of a VM for autonomic scaling includes storing, in the cloud operating system in association with an identifier of the instance of a VM, predetermined threshold values of operating characteristics, including threshold values for processor utilization and for memory utilization.

14. The computer program product of claim 11 wherein the cloud operating system comprises a module of automated computing machinery, further comprising a self service portal and a deployment engine, and deploying an additional instance of the VM further comprises:
- passing by the self service portal user specifications for the additional instance of the VM to the deployment engine;
- implementing and passing to the data center administration server, by the deployment engine with the user specifications, a same VM template used to deploy a previous instance of the VM; and
- calling, by the data center administration server, a hypervisor on a cloud computer to install the same VM template as a additional instance of the VM on a cloud computer.

15. The computer program product of claim 11 wherein the cloud operating system comprises a module of automated computing machinery, further comprising a self service portal, and terminating operation of the additional instance of the VM further comprises:
- transmitting, by the self service portal to the data center administration server, an instruction to terminate the additional instance of the VM; and
- calling, by the data center administration server, a hypervisor on a cloud computer to terminate operation of the additional instance of the VM on the cloud computer.

* * * * *

(12) INTER PARTES REVIEW CERTIFICATE (3778th)
United States Patent
Kern

(10) Number: US 8,572,612 K1
(45) Certificate Issued: Oct. 21, 2024

(54) AUTONOMIC SCALING OF VIRTUAL MACHINES IN A CLOUD COMPUTING ENVIRONMENT

(75) Inventor: Eric R. Kern

(73) Assignee: DAEDALUS BLUE LLC

Trial Number:

IPR2021-00830 filed May 7, 2021

Inter Partes Review Certificate for:

Patent No.: 8,572,612
Issued: Oct. 29, 2013
Appl. No.: 12/760,141
Filed: Apr. 14, 2010

The results of IPR2021-00830 are reflected in this inter partes review certificate under 35 U.S.C. 318(b).

INTER PARTES REVIEW CERTIFICATE
U.S. Patent 8,572,612 K1
Trial No. IPR2021-00830
Certificate Issued Oct. 21, 2024

AS A RESULT OF THE INTER PARTES REVIEW PROCEEDING, IT HAS BEEN DETERMINED THAT:

Claims 1-15 are cancelled.

\* \* \* \* \*